June 25, 1957 A. T. CLEMENT, JR 2,796,944

POWER LAWN MOWER CONTROL DEVICE

Filed July 29, 1954 2 Sheets-Sheet 1

Allen T. Clement, Jr.
INVENTOR.

BY Clarence A. O'Brien and Harvey B. Jacobson
Attorneys

June 25, 1957 A. T. CLEMENT, JR 2,796,944

POWER LAWN MOWER CONTROL DEVICE

Filed July 29, 1954 2 Sheets-Sheet 2

Allen T. Clement, Jr.
INVENTOR.

BY Clarence A. O'Brien and Harvey B. Jacobson
Attorneys

United States Patent Office 2,796,944

Patented June 25, 1957

1

2,796,944

POWER LAWN MOWER CONTROL DEVICE

Allen T. Clement, Jr., Clarksburg, Md.

Application July 29, 1954, Serial No. 446,553

2 Claims. (Cl. 180—79)

This invention relates to new and useful improvements in power mower guide and more specifically provides a device for guiding a power mower in a continuous circular or spiral path wherein a circular area of lawn will be automatically mowed.

In present day use of power lawn mowers, it is necessary for the operator to control the direction of the power lawn mower during its operation and to turn the lawn mower around in a reversed direction at each end of its path of movement. While this does not involve strenuous exertion, it is time consuming and inefficient as the time utilized for controlling the lawn mower could be put to other uses. For example, a person cutting a lawn may use the time normally expended in controlling the power lawn mower for trimming hedges or trimming grass beneath bushes and many similar projects. Therefore, it is the primary object of the present invention to automatically control a power mower so that the operator of the mower is not required to follow and control the mower during its operation thereby freeing the operator for performing other work thereby increasing the overall efficiency of the lawn cutting operation and saving time and energy.

Another object of the present invention is to provide a power mower guide that includes a central stationary reel together with an attachment for a power lawn mower wherein a flexible line is used to connect the reel and the attachment for guiding the power lawn mower in a continuous circular path of movement wherein the diameter is continuously decreasing thereby moving the power mower in a continuous spiral from its largest diameter of movement to a diameter of movement adjacent the stationary reel or from its smallest diameter adjacent the stationary reel to its largest diameter of movement remote from the stationary reel.

A further object of the present invention is to provide a power mower guide as set forth in the preceding objects and further provided with means for automatically stopping the power mower when it reaches its smallest diameter of operation adjacent the stationary reel thereby preventing the power mower from actually contacting the reel.

Still another important object of the present invention is to provide a power mower guide conformable to the preceding objects wherein the means for stopping the power mower is actuated by the guide attachment and stops the mower only at its smallest diameter of movement thereby permitting the mower to continue its movement when it reaches its largest diameter thereby providing a complete operation wherein the mower starts at its smallest diameter and unwinds all the flexible connecting line from the stationary reel and then proceeds in a spiral manner to its largest diameter wherein all the line is un-reeled and then returns in a spiral manner wherein the line is again wound upon the reel and automatically shutting itself off when it reaches its smallest diameter adjacent the stationary reel thereby providing a double trimming of the lawn about the reel if the double

2 trimming is desired although a single trimming may be provided if the lawn mower is started at its outermost position or largest diameter of movement.

A still further important object of the present invention is to provide elongated mounting brackets for the conventional roller positioned rearwardly of the cutting reel on a power mower wherein the power mower will be balanced and the traction wheels will be assured of contact with the ground for driving the power mower about the stationary centrally positioned reel.

Other important objects of the present invention will be found in its simplicity of construction, efficiency of operation, its ease of location for cutting various circular areas, its adaptability for various sizes of areas to be cut and its inexpensive manufacture and ease of attachment to the existing power mower.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 6, 7, 8:
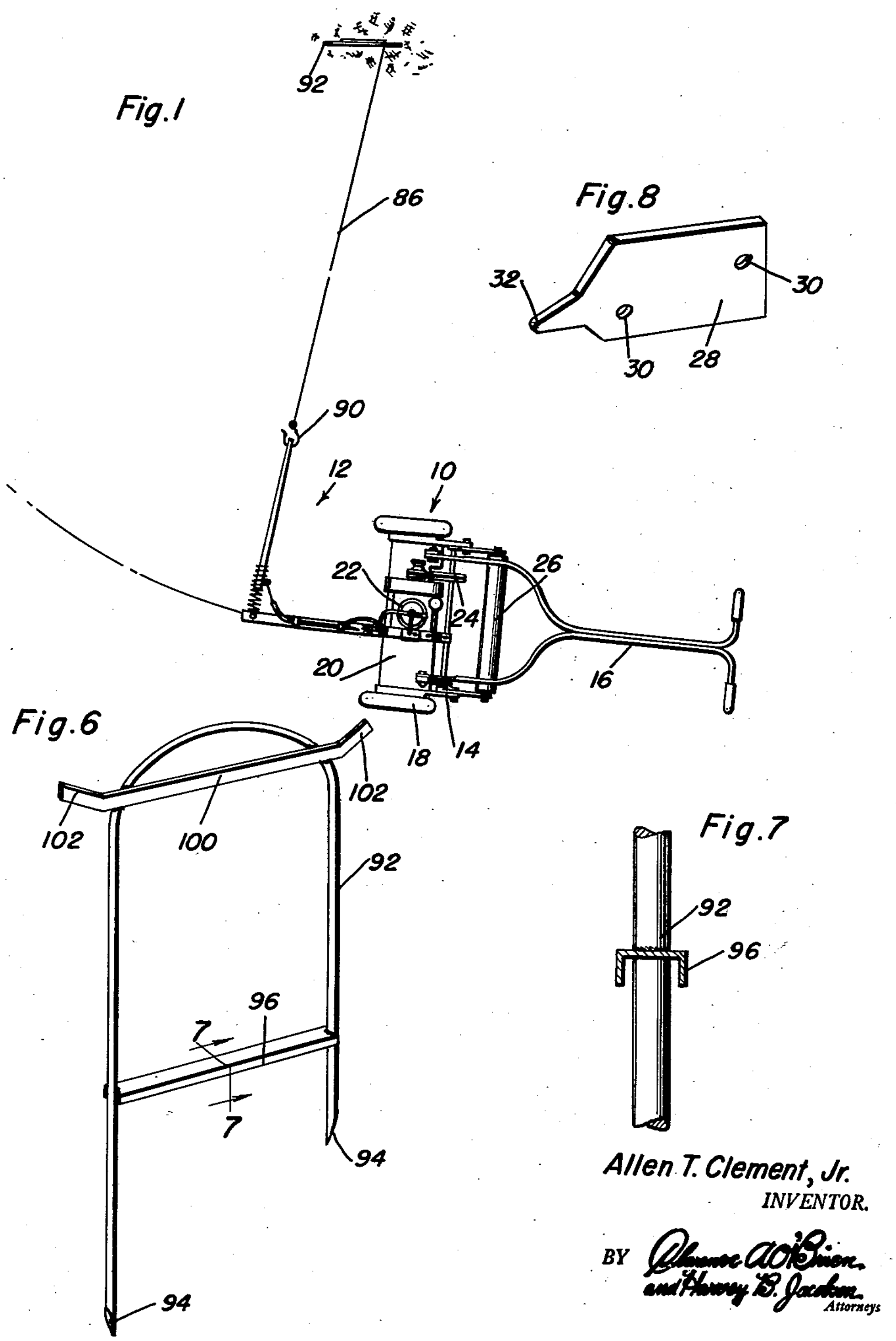
Figure 1 is a top plan view showing a power lawn mower of the reel type having the guide attachment of the present invention secured thereto.
Figure 6 is a perspective view showing further structural details of the stationary reel.
Figure 7 is a transverse, vertical sectional view taken substantially upon a plane passing along section line 7—7 of Figure 6 showing the structural details of the lower portion of the stationary reel.
Figure 8 is a perspective view showing the elongated mounting bracket for the rearwardly spaced rollers normally found on a reel type mower.

Referring now specifically to the drawings, it will be seen that the numeral 10 generally designates the power mower of the present invention having a guiding attachment generally indicated by the numeral 12 secured thereto for automatically guiding the mower 10 in a circular path wherein the mower will move in a continuous spiral.

The lawn mower 10 includes generally a frame 14, a rearwardly and upwardly extending handle 16 secured thereto for operating the mower 10, ground engaging traction wheels 18, a transverse plate 20, an internal combustion engine 22 mounted on the plate 20 and driving means 24 for driving the traction wheels 18 and the cutting reel positioned under the plate 20.

Referring now specifically to Figures 1 and 8, it will be seen that a roller 26 is normally secured to the rear portion of the frame 14 and in order to provide better balance for the mower 10, a pair of elongated brackets 28 having oppositely disposed apertures 30 therein and a projection 32 on the forward end is provided for attaching the roller 26 to the frame 14 in rearward spaced relation thereto thereby mounting the roller 26 farther rearwardly than is normal so that the traction wheels 18 will be assured constant contact with the ground. It will be seen that the rearwardly spaced roller 26 counteracts the weight of the handle thereby retaining the mower 10 in correct balanced relation.

Figures 2, 5:
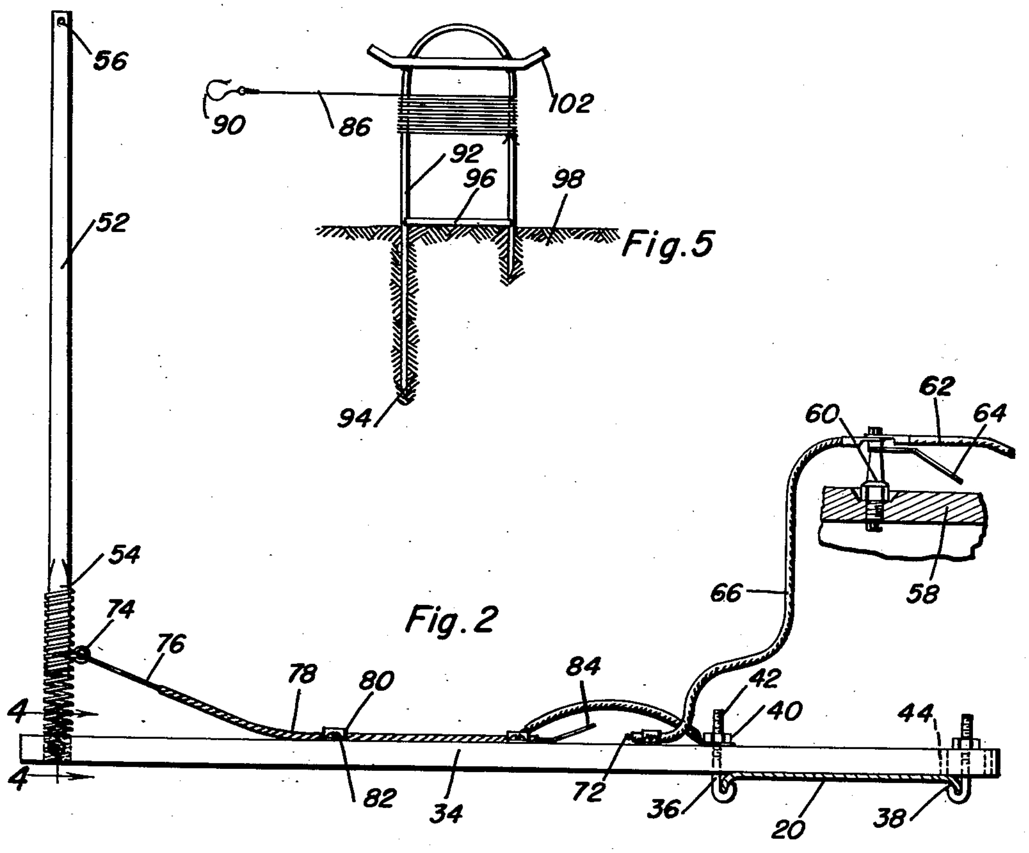
Figure 2 is a side elevational view of the attachment to the power mower showing the relationship of the means for automatically grounding the ignition system of the lawn mower.
Figure 5 is a side elevational view showing the details of construction of the stationary reel.

Referring now specifically to Figure 2, it will be seen that the guiding attachment 12 includes an elongated forwardly extending bar 34 having a pair of hook end bolts 36 at one end thereof wherein the hook ends of the bolts 36 are hooked over depending flanges 38 on the plate 20. The bolts 36 extend upwardly through the bar 34 and are secured thereto by nuts 40 engaging a screw threaded portion 42 of the bolt 36. The bolt 36 adjacent the end of the bar 34 may be positioned in one of several longitudinally spaced apertures 44 wherein the bar 34 may be positioned on mowers having different widths of mounting plates 20. Also, it will be understood that the bar 34 may be attached to other types of lawn mowers not having the specific shape of the plate 20 by any well known conventional fastening means. The outer end of the bar 34 remote from the plate 20 is provided with a bifurcated portion 46 having a screw threaded fastener 48 passing therethrough. A coil spring 50 is positioned between the legs of the bifurcated portion 46 and the screw threaded member 48 passes through the spring 50 thereby retaining the spring 50 between the legs of the bifurcated portion 46. Secured within the upper end of the coil spring 50 is an elongated vertically extending rod 52 having a reduced end portion 54 for insertion into the upper end of the spring 50 wherein the rod 52 will be retained within this spring 50 by frictional resilient contact between the spring 50 and the reduced end portion 54. The upper end of the rod 52 is provided with an aperture 56 for a purpose described hereinafter.

Figure 3:
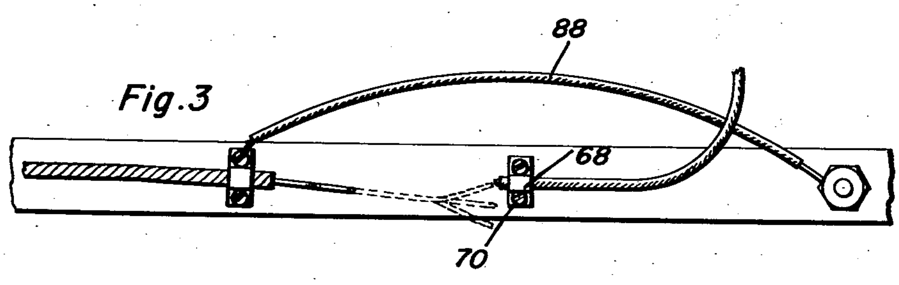
Figure 3 is a detailed top plan view showing the construction of the movable wire and the ground wire for grounding the ignition system of the power lawn mower.
Figure 4:
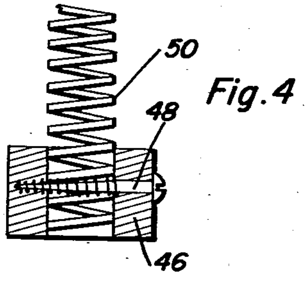
Figure 4 is a detailed sectional view taken substantially upon a plane passing along section line 4—4 of Figure 2 showing the details of attachment between the forwardly extending bar and the upperwardly extending rod.

Referring now specifically to Figures 2 and 3, it will be seen that the cylinder head 58 of the motor 22 is provided with a spark plug 60 and an ignition wire 62 leading from the magneto or other source of electrical energy for igniting the combustible mixture within the cylinder of the internal combustion engine 22. A spring contact member 64 is provided on the upper end of the spark plug for contact with the upper end of the cylinder head wherein the spring member 64 will ground the ignition wire 62 thereby stopping the internal combustion engine 22. This particular construction of the spark plug, ignition wire and the spring ground members 64 is conventional on lawn mowers now in use.

In addition to the above conventional ignition structure, an electrical conductor 66 is connected to the upper end of the spark plug 60 and in contact with the ignition wire 62 and at its other end is secured to the upper surface of the elongated bar 34 by a U-shaped clip 68 and fastening member 70. The outer end of the wire 66 is provided with an uncovered or uninsulated portion 72 for providing a stationary contact area to be described hereinafter.

Secured to the upstanding rod 52 adjacent the bottom end thereof and spaced vertically from the bar 34 is an eye member 74 having a wire 76 connected thereto. The wire 76 is positioned in a coil wire housing 78 and the housing 78 is secured to the upper surface of the bar 34 by a pair of U-shaped clips 80 secured thereto by fastening members 82. The end of the wire 76 projecting outwardly from the remote end of the coil wire housing 78 is upwardly bent as indicated by the numeral 84 and is normally in spaced relation to the uninsulated end 72 of the wire 66. A connecting wire 88 extends between one of the bolts 36 and the nearest U-shaped clip 80 for retaining the wire housing 78 on the bar 34. The wire 88 acts as an electrical conductor for grounding the wire 76 to the frame 20 and the internal combustion engine 22. The offset uninsulated end 84 of the wire 76 will contact the bared end portion 72 of the wire 66 when the rod 52 is moved or pivoted rearwardly and rotated or pulled inwardly caused when the mower is adjacent the reel and the line 86 is urging the mower towards the reel thereby grounding the ignition wire 62 through the wire 76 and the connecting wire 88 to the internal combustion engine 22 thereby stopping the engine 22 and the power mower 10.

The upper end of the upstanding rod 52 is connected to a flexible line 86 having a hook mounted on the end thereof for insertion in the aperture 56 and the other end of the line 86 is tied to one leg of a U-shaped reel 92. The U-shaped reel is provided with pointed ends 94 on the leg members with one leg being longer than the other for insertion and penetration into the ground. A transverse cross bar 96 is secured between the legs of a U-shaped member 92 in spaced relation to the lower ends thereof wherein the transverse bar is substantially in the shape of an inverted channel and provides a limit for the insertion of the pointed end 94 into the ground surface 98. Extending transversely across the bight portion of the U-shaped member 92 adjacent the upper end thereof is a transverse member 100 having upwardly flared end portions 102 wherein the upwardly flared end portions 102 act as guides for the flexible line 86 as it winds upon and unwinds from the reel 92.

In operation, the flexible line 86 that is unwound from the reel 92 will be attached to the upstanding rod 52 by utilizing the hook 90. The power mower 10 has been started by utilizing the internal combustion engine 22 wherein the line 86 will guide the mower 10 in a spiral circular movement thereby cutting the lawn or grass in circles of continuously diminishing radii substantially in the nature of a continuous spiral until the flexible line 86 becomes relatively short. When this position is reached, the upwardly extending rod 52 is pulled inwardly and at the same time pulled rearwardly substantially as illustrated in Figure 1. In this condition, the wire 76 is pivoted about its longitudinal axis and moved toward the uninsulated portion 72 of the wire 66 wherein the offset end or movable contact 84 will contact and ground the wire 66 thereby stopping the engine 22. The dotted line position of the offset end 84 of the wire 76 when in contact with the member 72 is shown in Figure 3. It is not necessary for the end of the wire 76 to come into actual contact with the end 72 of the wire 66 but it must assume a close proximity in order to provide the electrical energy with the path of least resistance thereby grounding the spark plug 60 and the ignition wire 62. If the upstanding member 52 is only pulled rearwardly, the wire 76 does not contact the end 72 and the mower 10 continues to operate. If the mower is hooked up to the line 86 with the line 86 coiled about the reel 92, the unwinding operation of the reel will tend to move the rod 52 in the other direction thereby pivoting the wire 76 about its longitudinal axis and moving the offset portion 84 away from the bared end 72 of the wire 66 thereby permitting continuous operation of the mower 10. The device may be started with the cable or line 86 wound about the reel 92 and continue in an unwinding cycle and then in a winding cycle or only a single cycle may be used if necessary or desirable. Also, it will be seen that the reel 92 may be positioned in various positions on the lawn with the desired amount of line 86 unwound to adapt the mowing operation to various sizes of lawn having various obstructions therein.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A guide and ignition cut off apparatus for a power lawn mower comprising an elongated bar extending rigidly from the front of the mower in parallel relation to the straight path of movement thereof, an upwardly extending rod, a coil spring supported on and extending upwardly from the forward end of the bar with the upper end being attached to the lower end of the upstanding rod thereby resiliently retaining the rod in vertical position and permitting pivotal movement thereof in any direction, a ground wire connected to the ignition system of the lawn mower, normally open switch means in said ground wire, said switch means including a movable contact connected with said upstanding rod and a stationary contact, said movable contact being spaced from the stationary contact when the upstanding rod is in vertical position or radially inward position, a flexible guide line connected to the upper end of the upstanding rod, said guide line being terminally attached to a stationary post disposed centrally in an area to be mowed, the movement of the lawn mower in a straight line path and the winding of the line around the post pivoting the rod radially inwardly and urging the forward end of the bar inwardly thereby guiding the lawn mower in a generally spiral path about the post, the acute included angle between the straight line path of movement and bar of the mower and the rod and flexible line progressively reducing as the line is wound upon the post for moving the movable contact into engagement with the stationary contact thereby closing the switch means and grounding the ignition system for stopping the mower as it approaches the center of the area to be mowed.

2. The structure as defined in claim 1 wherein said switch means includes an uninsulated end portion on the ground wire forming the stationary contact, a movable section of the ground wire having one end connected to the upstanding rod at a point above the elongated bar whereby pivotal movement of the rod towards the mower will cause longitudinal movement of the movable section, the movable section of the wire being movably disposed in a coil wire casing on the elongated bar with the free end thereof being uninsulated and forming the movable contact, the movable contact approaching the stationary contact as the included angle between the rod and bar becomes more acute as the flexible line is wound about the stationary post.

References Cited in the file of this patent

UNITED STATES PATENTS

| | | |
|---|---|---|
| 2,259,193 | Andrew | Oct. 14, 1941 |
| 2,513,868 | Hill | July 4, 1950 |

OTHER REFERENCES

Mutt and Jeff Comic Strip, Washington Evening Star, August 24, 1942.